United States Patent
Reed et al.

(10) Patent No.: US 11,237,869 B2
(45) Date of Patent: Feb. 1, 2022

(54) SYSTEM FOR INTELLIGENT ROUTING OF RESOURCES ASSOCIATED WITH RESOURCE ENTITIES

(71) Applicant: BANK OF AMERICA CORPORATION, Charlotte, NC (US)

(72) Inventors: Alfred James Reed, Huntersville, NC (US); Douglas Edward Houser, Allentown, NJ (US); Robert W. Johnston, Ramsey, NJ (US); Michael J. Miller, New York, NY (US); Jaqueline R. Sousa, Newark, NJ (US); Catherine Ann Worth, Ponte Vedra Beach, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 240 days.

(21) Appl. No.: 16/572,013

(22) Filed: Sep. 16, 2019

(65) Prior Publication Data

US 2021/0081244 A1 Mar. 18, 2021

(51) Int. Cl.
*G06F 9/50* (2006.01)
*G06F 11/30* (2006.01)

(52) U.S. Cl.
CPC .......... *G06F 9/5011* (2013.01); *G06F 9/5027* (2013.01); *G06F 11/3006* (2013.01)

(58) Field of Classification Search
CPC .. G06F 11/3006; G06F 9/5011; G06F 9/5027; G06Q 20/108; G06Q 20/405
See application file for complete search history.

(56) References Cited

U.S. PATENT DOCUMENTS

| | | | |
|---|---|---|---|
| 6,701,303 B1 | 3/2004 | Dunn et al. | |
| 6,796,492 B1 * | 9/2004 | Gatto | G06Q 20/10 235/379 |
| 7,413,119 B2 | 8/2008 | Kubo et al. | |
| 7,822,679 B1 | 10/2010 | Vaux et al. | |
| 7,860,789 B2 | 12/2010 | Hirka et al. | |
| 7,890,422 B1 | 2/2011 | Hirka et al. | |
| 7,895,119 B2 | 2/2011 | Praisner | |
| 7,896,234 B2 | 3/2011 | Kubo et al. | |
| 7,900,829 B1 | 3/2011 | Folk et al. | |
| 8,515,868 B2 | 8/2013 | Hirka et al. | |
| 8,732,077 B2 | 5/2014 | Calman | |

(Continued)

FOREIGN PATENT DOCUMENTS

WO 2019090312 A1 5/2019

*Primary Examiner* — Jorge A Chu Joy-Davila
(74) *Attorney, Agent, or Firm* — Moore & Van Allen PLLC; Nicholas C. Russell (57) ABSTRACT

A system is typically configured to continuously monitor one or more channels, wherein the one or more channels are associated with sources of initiation of resource transfer requests, receive a resource transfer request from a resource entity system via at least one channel of the one or more channels, in response to receiving the resource transfer request, generate, via an artificial intelligence engine, one or more recommendations associated with routing of the resource transfer request, wherein each of the one or more recommendations comprises a resource transfer method, and route the resource transfer request via a resource transfer method associated with at least one recommendation of the one or more recommendations.

18 Claims, 6 Drawing Sheets

(56) References Cited

U.S. PATENT DOCUMENTS

| | | | |
|---|---|---|---|
| 8,751,383 B2 | 6/2014 | Hirka et al. | |
| 10,026,085 B2 | 7/2018 | Richards | |
| 10,140,597 B2 | 11/2018 | Benton et al. | |
| 2010/0211499 A1 | 8/2010 | Zanzot et al. | |
| 2013/0080328 A1* | 3/2013 | Royyuru | G06Q 40/02 |
| | | | 705/44 |
| 2014/0025567 A1* | 1/2014 | Rigby | G06Q 20/26 |
| | | | 705/39 |
| 2014/0081861 A1* | 3/2014 | Berland | G06Q 30/0239 |
| | | | 705/44 |
| 2015/0012425 A1* | 1/2015 | Mathew | G06Q 20/36 |
| | | | 705/41 |

\* cited by examiner

SYSTEM FOR INTELLIGENT ROUTING OF RESOURCES ASSOCIATED WITH RESOURCE ENTITIES

BACKGROUND

Current conventional systems do not have the capability to provide recommendations associated with resource transfers to resource entities or to automatically route resources associated with resource entities. As such, there exists a need for a system to intelligently provide recommendations and route resources associated with resource entities.

BRIEF SUMMARY

Embodiments of the present invention address the above needs and/or achieve other advantages by providing apparatuses (e.g., a system, computer program product and/or other devices) and methods for intelligently routing resources associated with resource entities. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may continuously monitor one or more channels, wherein the one or more channels are associated with sources of initiation of resource transfer requests, receive a resource transfer request from a resource entity system via at least one channel of the one or more channels, in response to receiving the resource transfer request, generate, via an artificial intelligence engine, one or more recommendations associated with routing of the resource transfer request, wherein each of the one or more recommendations comprises a resource transfer method, and route the resource transfer request via the resource transfer method associated with at least one recommendation of the one or more recommendations.

In some embodiment, the present invention routes the resource transfer request via the resource transfer method by automatically selecting the at least one recommendation based on one or more factors.

In some embodiment, the present invention routes the resource transfer request via the resource transfer method by displaying the one or more recommendations to a user associated with the resource entity system, via a graphical user interface associated with the at least one channel, receiving a selection from the resource entity system, via the graphical user interface, wherein the selection comprises the resource transfer method associated with at least one recommendation, and initiating the resource transfer request via the resource transfer method associated with the at least one recommendation.

In some embodiment, the present invention receives resource entity preferences from the entity system, via a portal interface, stores the resource entity preferences in a data store, receives third party entity preferences from at least one of a third party system and the resource entity system, via the portal interface, and stores the third party entity preferences in the datastore.

In some embodiment, the present invention generates the one or more recommendations based on at least one of the resource entity preferences, the third party entity preferences, location of a third party associated with the resource transfer request, speed of the resource transfer request, security associated with the resource transfer request, and resources associated with the resource transfer request.

In some embodiment, the present invention generates metrics associated with the one or more recommendations and displays the metrics via a portal interface to a user.

In some embodiment, the present invention determines a type of each of the resource transfer requests, identifies that at least one resource transfer request is associated with a predetermined type, flags the at least one resource transfer request, and routes the at least one resource transfer request via a predetermined resource transfer method.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" or "entity system" may include any organization that processes financial transactions including, but not limited to, banks, credit unions, savings and loan associations, investment companies, stock brokerages, resource management firms, insurance companies and the like. In accordance with embodiments of the invention, the terms "resource entity" or "resource entity system" may include any organization that provides services, products, goods, or the like to consumers. In some embodiments, the resource entity that may be a customer of the entity. Examples of resource entities may include corporate organizations. In accordance with embodiments of the present invention, the term "third party entity" may be any organization that provides service, products, foods, or the like (e.g., supplier of machine parts or other services) to the resource entity. Furthermore, embodiments of the present invention use the term "user." It will be appreciated by someone with ordinary skill in the art that the user may be an employee of the resource entity and/or the third party entity.

As used herein the term "resources" may include monetary funds. As used herein, the term "account" or "resource pool" may be the relationship that the resource entity has with the entity. Examples of accounts include a deposit account, such as a transactional account (e.g. a banking account), a savings account, an investment account, a money market account, a time deposit, a demand deposit, a pre-paid account, a credit account, a non-monetary customer datafile that includes only personal information associated with the customer, or the like. An account may be maintained by the entity. As used herein the term "resource transfer" may include transfer of resources from a benefactor (i.e., resource entity) to a beneficiary (i.e., third party entity).

Figure 1:
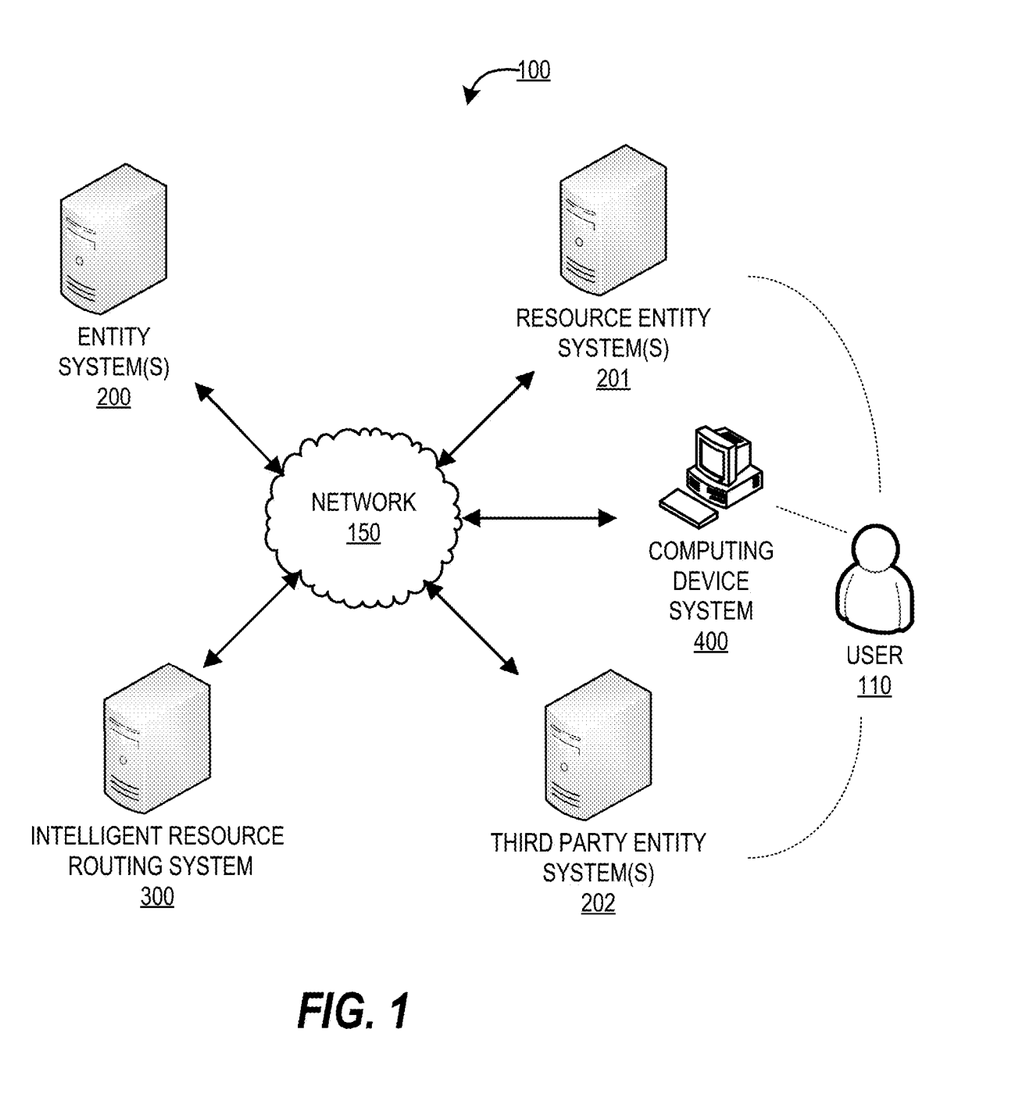
FIG. 1 provides a block diagram illustrating a system environment for intelligently routing resources associated with resource entities, in accordance with an embodiment of the invention.

FIG. 1 provides a block diagram illustrating a system environment 100 for intelligently routing resources associated with resource entities, in accordance with an embodiment of the invention. As illustrated in FIG. 1, the environment 100 includes an intelligent resource routing system 300, entity system 200, a computing device system 400, one or more resource entity systems 201, and one or more third party entity systems 202. One or more users 110 may be included in the system environment 100, where the users 110 interact with the other entities of the system environment 100 via a user interface of the computing device system 400. In some embodiments, the one or more user(s) 110 of the system environment 100 may be employees of a resource entity associated with the resource entity system 201 or a third party entity associated with the third party entity system 202.

The entity system(s) 200 may be any system owned or otherwise controlled by an entity to support or perform one or more process steps described herein. In some embodiments, the entity is a financial institution.

The intelligent resource routing system 300 is a system of the present invention for performing one or more process steps described herein. In some embodiments, the intelligent resource routing system 300 may be an independent system. In some embodiments, the intelligent resource routing system 300 may be a part of the entity system 200.

The intelligent resource routing system 300, the entity system 200, the computing device system 400, the resource entity system 201, and/or the third party entity system 202 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the intelligent resource routing system 300 is configured to communicate information or instructions with the entity system 200, the computing device system 400, the third party entity system 202, and/or the resource entity system 201 across the network 150.

The computing device system 400 may be a computing device of the user 110. In general, the computing device system 400 communicates with the user 110 via a user interface of the computing device system 400, and in turn is configured to communicate information or instructions with the intelligent resource routing system 300, the entity system 200, the third party entity system 202, and/or the resource entity system 201 across the network 150. In some embodiments, the user 110 may utilize the resource entity system 202 to communicate with the intelligent resource routing system 300, the entity system 200, and/or the third party entity system 202 when the user 110 is an employee of the resource entity. In some embodiments, the user 110 may utilize the third party entity system 202 to communicate with the intelligent resource routing system 300, the entity system 200, and/or the resource entity system 201 when the user 110 is an employee of the third party entity.

Figure 2:
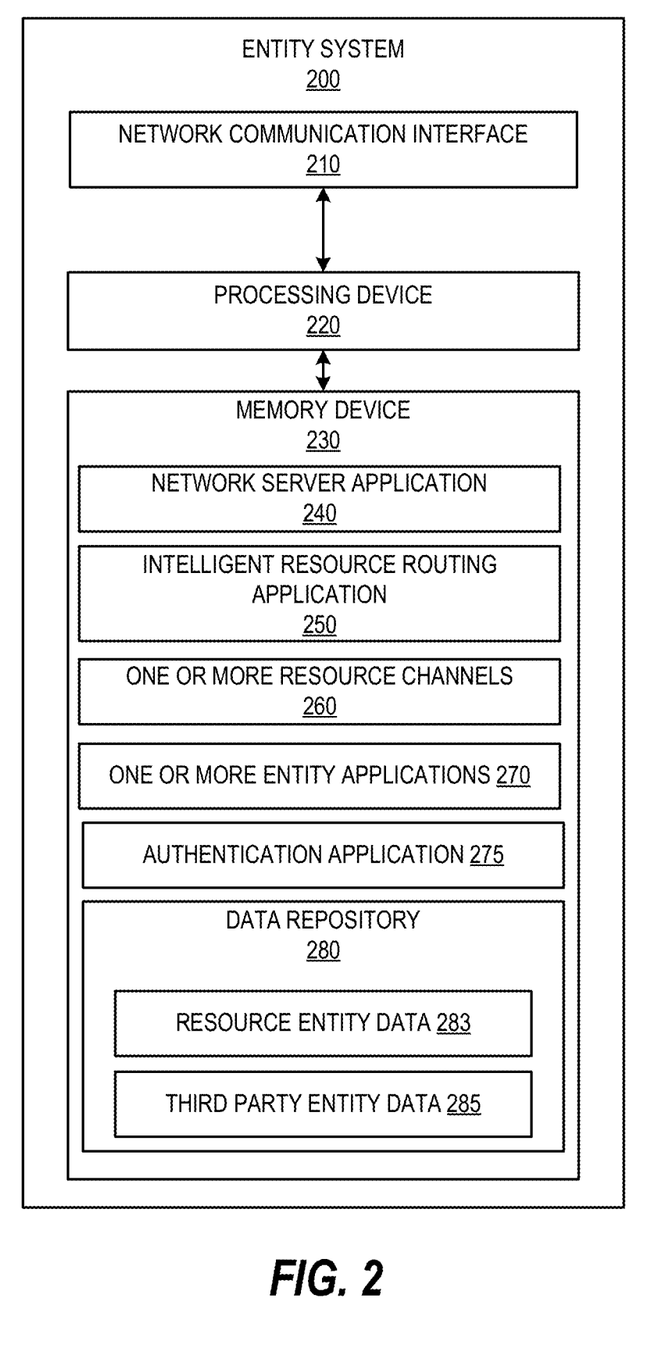
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an intelligent resource routing application 250, one or more resource channels 260, one or more entity applications 270, an authentication application 275, and a data repository 280 comprising resource entity data 283 and third party entity data 285. The resource entity data 283 may include historical transaction data associated with the resource entity, preferences associated with the resource entity, beneficiaries associated with the resource entity, organization data (e.g., location, organization name, and the like), or the like. The third party entity data 285 may include historical transaction data associated with the third party entity, third party entity preferences, third party entity system requirements, organization data (e.g., location, organization name, and the like), or the like. The computer-executable program code of the network server application 240, the intelligent resource routing application 250, the one or more resource channels 260, the one or more entity applications 270, and the authentication application 275 to perform certain logic, data-extraction, and data-storing functions of the entity system 200 described herein, as well as communication functions of the entity system 200.

The network server application 240, the intelligent resource routing application 250, the one or more resource channels 260, the one or more entity applications 270, and the authentication application 275 are configured to store data in the data repository 280 or to use the data stored in the data repository 280 when communicating through the network communication interface 210 with the intelligent resource routing system 300, the computing device system 400, the third party entity system 202, and/or the resource entity systems 201 to perform one or more process steps described herein. In some embodiments, the entity system 200 may receive instructions from the intelligent resource routing system 300 via the intelligent resource routing application 250 to perform certain operations. The intelligent resource routing application 250 may be provided by the intelligent resource routing system 300. The one or more resource channels may be payment channels associated with the system, where the payment channels may include management portal applications provided by the entity, using which the customers (e.g., the resource entity) of the entity may initiate payment transfers. The one or more entity applications 270 may be any applications utilized/provided by the entity (e.g., online banking application).

Figure 3:
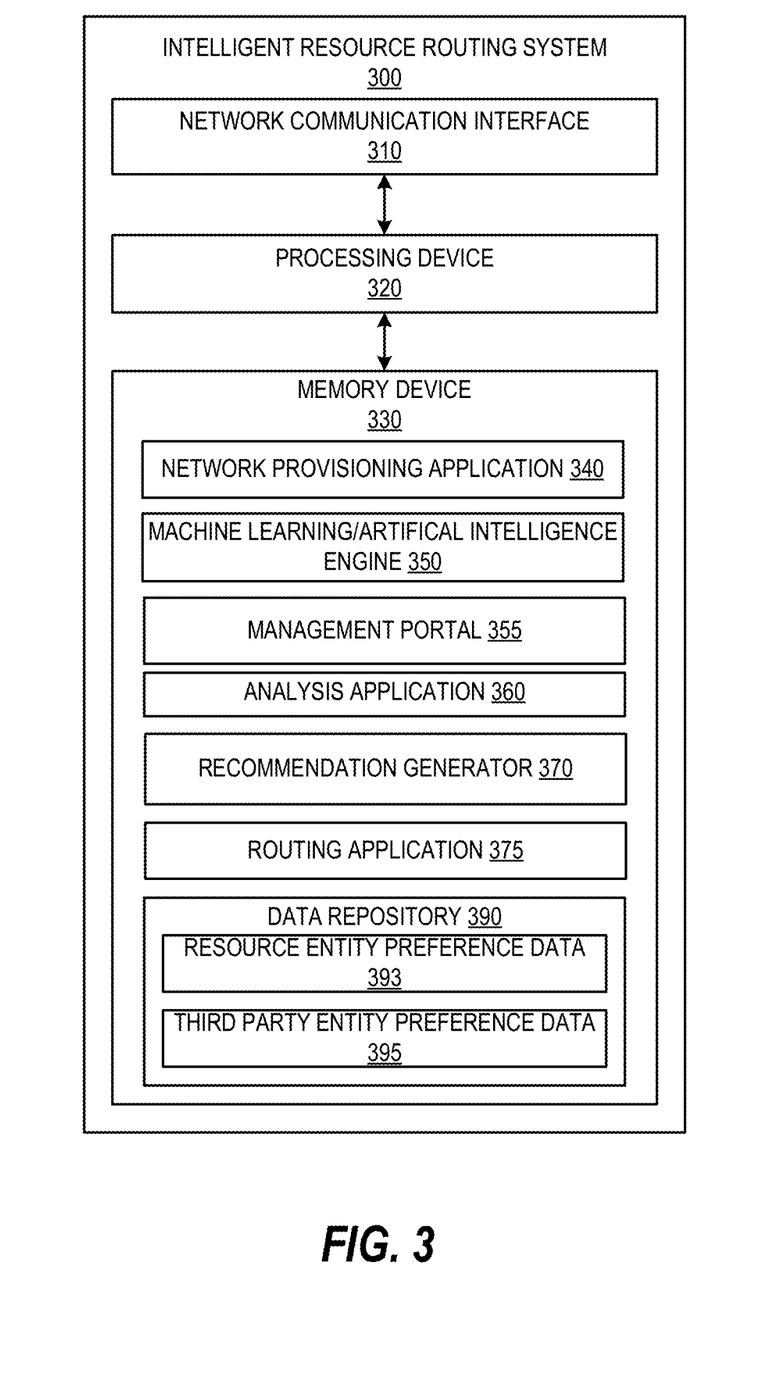
FIG. 3 provides a block diagram illustrating an intelligent resource routing system 300 of FIG. 1, in accordance with an embodiment of the invention.

FIG. 3 provides a block diagram illustrating the intelligent resource routing system 300 in greater detail, in accordance with embodiments of the invention. As illustrated in FIG. 3, in one embodiment of the invention, the intelligent resource routing system 300 includes one or more processing devices 320 operatively coupled to a network communication interface 310 and a memory device 330. In certain embodiments, the intelligent resource routing system 300 is operated by a first entity, such as a financial institution. In some embodiments, the intelligent resource routing system 300 is owned or operated by the entity of the entity system 200. In some embodiments, the intelligent resource routing system 300 may be an independent system. In alternate embodiments, the intelligent resource routing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the intelligent resource routing system 300 described herein. For example, in one embodiment of the intelligent resource routing system 300, the memory device 330 includes, but is not limited to, a network provisioning application 340, a machine learning/artificial intelligence engine 350, a management portal 355, an analysis application 360, a recommendation generator 370, a routing application 375, and a data repository 390 comprising resource entity preference data 393, third party entity preference data 395, and/or other data processed or accessed by one or more applications in the memory device 330. The computer-executable program code of the network provisioning application 340, the machine learning/artificial intelligence engine 350, the management portal 355, the analysis application 360, the recommendation generator 370, and the routing application 375 may instruct the processing device 320 to perform certain logic, data-processing, and data-storing functions of the intelligent resource routing system 300 described herein, as well as communication functions of the intelligent resource routing system 300.

The network provisioning application 340, the machine learning/artificial intelligence engine 350, the management portal 355, the analysis application 360, the recommendation generator 370, and the routing application 375 are configured to invoke or use the data in the data repository 390 when communicating through the network communication interface 310 with the entity system 200, the computing device system 400, the third party entity system 202, and/or the resource entity systems 201. In some embodiments, the network provisioning application 340, the machine learning/artificial intelligence engine 350, the management portal 355, the analysis application 360, the recommendation generator 370, and the routing application 375 may store the data extracted or received from the entity system 200, the resource entity system 201, and the computing device system 400 in the data repository 390. In some embodiments, the network provisioning application 340, the machine learning/artificial intelligence engine 350, the management portal 355, the analysis application 360, the recommendation generator 370, and the routing application 375 380 may be a part of a single application. One or more processes performed by the network provisioning application 340 the machine learning/artificial intelligence engine 350, the management portal 355, the analysis application 360, the recommendation generator 370, and the routing application 375 are described in detail below in FIG. 5 and FIG. 6.

Figure 4:
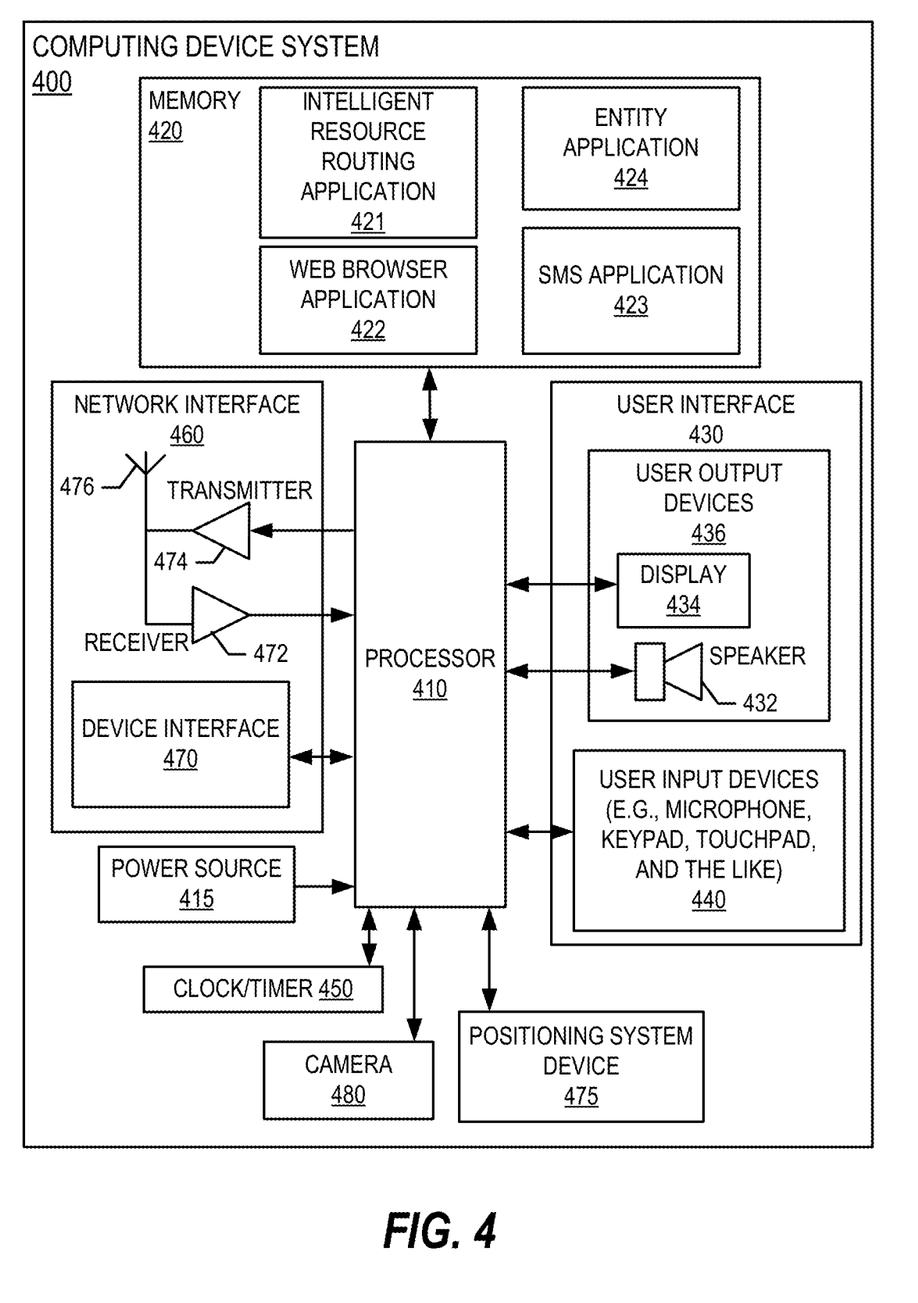
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an intelligent resource routing application 421, an entity application 424, or the like. These applications also typically instructions to a graphical user interface (GUI) on the display 430 that allows the user 110 to interact with the entity system 200, the intelligent resource routing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the intelligent resource routing application 421 provided by the intelligent resource routing system 300 allows the user 110 to communicate with one or more resource entity systems 201 anonymously. In some embodiments, the entity application 424 provided by the entity system 200 and the intelligent resource routing application 421 allow the user 110 to perform one or more interactions. In some embodiments, the entity application 424 may be an online banking application. In some embodiments, the intelligent resource routing system 300 monitors user activity via the entity application 424, the web browser application 422, and other application stored in the memory 420.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
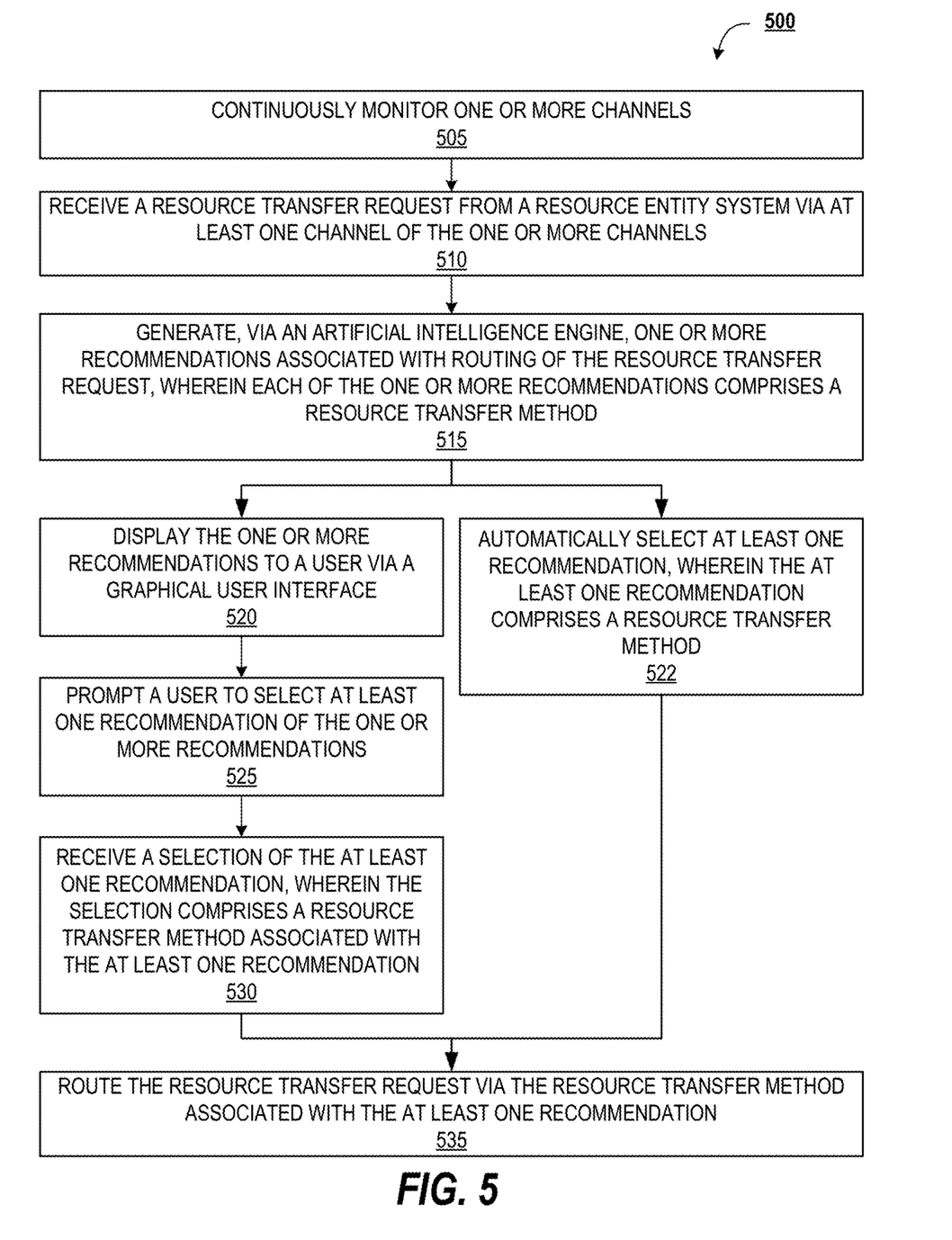
FIG. 5 provides a flowchart illustrating a process flow for intelligently routing resources associated with resource entities, in accordance with an embodiment of the invention.

FIG. 5 illustrates a process flow 500 for intelligent routing of resources associated with resource entities, in accordance with an embodiment of the present invention. As shown in block 505, the system continuously monitors one or more channels. The one or more channels may include sources for initiating resource transfers requests. The one or more channels, may include, but are not limited to, resource entity payment management portal, an entity application, an entity payment management portal, API, file transfer, online, host2host, mobile, or the like. For example, a resource entity may initiate a resource transfer request via a payment management portal provided by the entity. In another example, another resource entity may initiate a resource transfer request via a mobile payment application provided by the entity. The system may monitor the one or more channels to identify the incoming resource transfer requests.

As shown in block 510, the system, receives a resource transfer request from a resource entity system via at least one channel of the one or more channels. In response to monitoring the one or more channels, the system identifies the incoming resource transfer request via the at least one channel. The incoming resource transfer request may include information including, but not limited to, third party entity (i.e., beneficiary) information, resource amount, pay by date, speed of the transfer, cost associated with the transfer or the like. In an exemplary embodiment, a user associated with a resource entity may login to the payment management portal provided by the entity and may fill a form associated with the resource transfer request, where the form include one or fields associated with the resource transfer. In some embodiment, a user associated with a resource entity may transfer a file associated with the resource transfer request from a resource entity payment management portal to the system and/or the entity system. In another exemplary embodiment, a user associated with a resource entity may initiate the resource transfer request via an API.

As shown in block 515, the system in response to receiving the resource transfer request, generates, via an artificial intelligence engine, one or more recommendations associated with routing of the resource transfer request, wherein each of the one or more recommendations comprises a resource transfer method. The resource transfer methods may include but are not limited to payment rails such as check transfer, wire transfer, Automated Clearing House (ACH) transfer, card transfer, payment in real-time, blockchain payment, digital disbursements, or the like. For each resource transfer request, the recommendations generated by the system may vary. The system generates the one or more recommendations based on resource entity preferences, resource entity business model the third party entity preferences, location of a third party associated with the resource transfer request, speed of the resource transfer request, security associated with the resource transfer request, and resources associated with the resource transfer request, or the like. For example, the system may identify that an incoming payment transfer request is associated with a beneficiary, where the beneficiary is located overseas and that the beneficiary may accept only wire transfers and real-time payments. The system may then generate two recommendations comprising wire transfer and real-time payment. In the same example, if a resource entity that initiated the incoming payment transfer request prefers real-time payments over wire transfers, then the system may generate only recommendation that comprises a payment rail. In some embodiments, the system may generate the recommendations based on what other resource entities similar to the resource entity are choosing. For example, the system may identify that an organization 'A' is transferring payments similar to the resource transfer request via payment method to similar beneficiaries such as the third party entity and may recommend the real-time payment method to the resource entity.

As shown in block 520, the system displays the one or more recommendations to a user via a graphical user interface associated with the at least one channel. The user may be an employee of the resource entity. In an example, if the resource transfer request is initiated via a mobile application, the system may display the one or more recommendations via a graphical user interface associated with the mobile application. As shown in block 525, the system prompts a user to select at least one recommendation of the one or more recommendations. As shown in block 530, the system receives a selection of the at least one recommendation, where the selection comprises a resource transfer method associated with the at least one recommendation. For example, the user after looking at the one or more payment rails recommended by the system, may select one payment rail and may transfer the selected payment rail back to the system.

In alternative embodiments, the process flow 500 instead of going through blocks 520, 525, and 530, moves to block 522. In some embodiments, as shown in block 522, the system automatically selects at least one recommendation, where the at least one recommendation comprises a resource transfer method. The system may automatically select the at least one recommendation based on historical transaction data, resource entity preferences, third party entity preferences, time constraints, cost associated with the transfer, and the like. The system optimizes the route of payment based on the one or more factors discussed above, via the artificial intelligence engine. In some embodiments where the system automatically selects the at least one recommendation, the system also generates analysis data associated with the selection process and displays the analysis data to the resource entity associated with the resource transfer request. In an exemplary embodiment, if the system automatically selects a real-time payment rail to route the resource transfer, the system generates data associated with the decision process.

As shown in block 535, the system routes the resource transfer request via the resource transfer method associated with the at least one recommendation. The system also generates metrics associated with savings and payment transfers associated with one or more resource entities and displays the metrics in the payment management portal provided by the entity. For example, the system may generate data that may include savings associated with choosing a resource transfer method. In some embodiments the system may transfer a file comprising the generated metrics back to the resource system. The system in some embodiments, may determine type of each of the incoming transfer requests, identify a type of an incoming transfer request matches with a predetermined type and may route the incoming request via a predetermined resource transfer method. For example, the system may identify that an incoming transfer request is a time sensitive and highly secure transfer, flag and prioritize the transfer request and may choose a predetermined resource transfer method specified by the resource entity.

Figure 6:
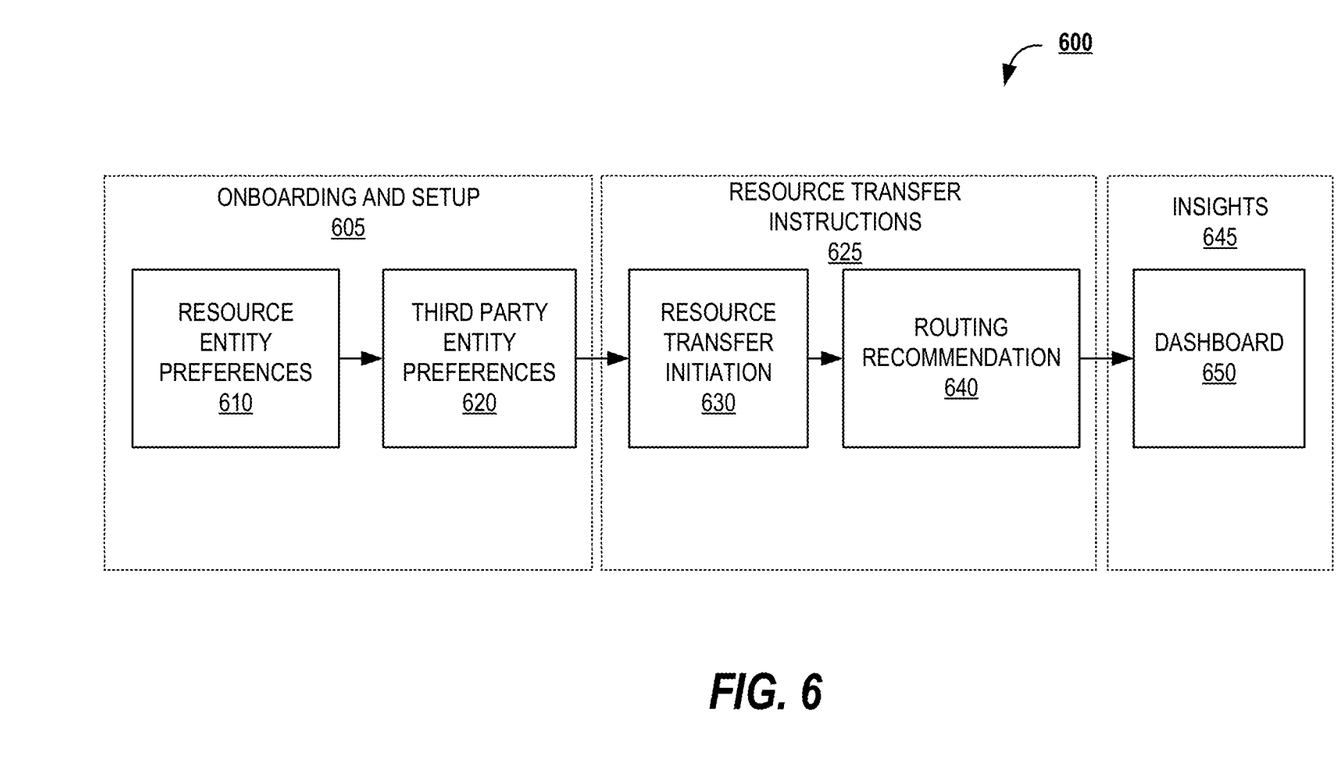
FIG. 6 provides a block diagram illustrating the routing of resources by the intelligent resource routing system 300 of FIG. 1, in accordance with an embodiment of the invention.

FIG. 6 provides a block diagram 600 illustrating the routing of resources by the intelligent resource routing system 300 of FIG. 1, in accordance with an embodiment of the invention. The block diagram 600 illustrates the process flow associated with routing of resources via the payment management portal provided by the entity. The system, via the payment management portal, performs onboarding and setup 605 associated with each of the one or more resource entities that are customers of the entity. As a part of the onboarding and setup 605, the system collects resource entity preferences 610 and third party entity preferences 620 from the one or more resource entities and stores them in a datastore. In some embodiments, the system receives the third party entity preferences 620 directly from the third party entity. For example, after a resource entity provides information associated with one or more beneficiaries, the system may automatically communicate with the beneficiaries (e.g., third party systems) to gather the preference data.

After completion of the onboarding and setup 605, the system may then resource receive resource transfer instructions 625 from a resource entity. Receiving the resource transfer instructions may include resource transfer initiation 630 and receiving information associated with the resource transfer. The system based on identifying the resource transfer initiation 630 may provide a routing recommendation 640 and may route the resource transfer, via the routing recommendation 640. The system may then provide insights 645 associated with the resource transfers via a dashboard 650 on the portal. The insights 645 may include metrics or the like.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for intelligent routing of resources, comprising:
   one or more computer processors;
   a memory; and
   a processing module stored in the memory comprising instructions executable by the one or more computer processors, wherein the instructions are configured to:
      monitor one or more channels, wherein the one or more channels are associated with sources of initiation of resource transfer requests, wherein the one or more channels comprise a resource entity payment management portal, an entity application, an entity payment management portal, an API, a file transfer, an online channel, and a host2host channel;
      receive a resource transfer request from a resource entity system via at least one channel of the one or more channels;
      in response to receiving the resource transfer request, generate, via an artificial intelligence engine, one or more recommendations associated with routing of the resource transfer request, wherein each of the one or more recommendations comprises a resource transfer method, wherein generating the one or more recommendations is based on resource entity preferences, third party entity preferences, location of a third party associated with the resource transfer request, speed of the resource transfer request, security associated with the resource transfer request, and resources associated with the resource transfer request; and
      route the resource transfer request via the resource transfer method associated with at least one recommendation of the one or more recommendations.

2. The system of claim 1, wherein routing the resource transfer request via the resource transfer method further comprises automatically selecting the at least one recommendation based on one or more factors.

3. The system of claim 1, wherein routing the resource transfer request via the resource transfer method further comprises:
   displaying the one or more recommendations to a user associated with the resource entity system, via a graphical user interface associated with the at least one channel;
   receiving a selection from the resource entity system, via the graphical user interface, wherein the selection comprises the resource transfer method associated with the at least one recommendation; and
   initiating the resource transfer request via the resource transfer method associated with the at least one recommendation.

4. The system of claim 1, further comprising:
   receiving the resource entity preferences from the resource entity system, via a portal interface;
   storing the resource entity preferences in a data store;
   receiving the third party entity preferences from at least one of a third party system and the resource entity system, via the portal interface; and
   storing the third party entity preferences in the datastore.

5. The system of claim 1, further comprising:
   generating metrics associated with the one or more recommendations; and
   displaying the metrics via a portal interface to a user.

6. The system of claim 1, further comprising:
   determining a type of each of the resource transfer request;
   identifying that at least one resource transfer request is associated with a predetermined type;
   flagging the at least one resource transfer request; and
   routing the at least one resource transfer request via a predetermined resource transfer method.

7. A computer program product for intelligent routing of resources, comprising a non-transitory computer-readable storage medium having computer-executable instructions for:
   monitoring one or more channels, wherein the one or more channels are associated with sources of initiation of resource transfer requests, wherein the one or more channels comprise a resource entity payment management portal, an entity application, an entity payment management portal, an API, a file transfer, an online channel, and a host2host channel;
   receiving a resource transfer request from a resource entity system via at least one channel of the one or more channels;
   in response to receiving the resource transfer request, generating, via an artificial intelligence engine, one or more recommendations associated with routing of the resource transfer request, wherein each of the one or more recommendations comprises a resource transfer method, wherein generating the one or more recommendations is based on resource entity preferences, third party entity preferences, location of a third party associated with the resource transfer request, speed of the resource transfer request, security associated with the resource transfer request, and resources associated with the resource transfer request; and
   routing the resource transfer request via the resource transfer method associated with at least one recommendation of the one or more recommendations.

8. The computer program product according to claim 7, wherein the non-transitory computer-readable storage medium comprises computer-executable instructions for routing the resource transfer request via the resource transfer method based on automatically selecting the at least one recommendation based on one or more factors.

9. The computer program product according to claim 7, wherein the computer-executable instructions for routing the resource transfer request comprises:
   displaying the one or more recommendations to a user associated with the resource entity system, via a graphical user interface associated with the at least one channel;
   receiving a selection from the resource entity system, via the graphical user interface, wherein the selection comprises the resource transfer method associated with the at least one recommendation; and
   initiating the resource transfer request via the resource transfer method associated with the at least one recommendation.

10. The computer program product according to claim 7, wherein the computer-executable instructions further comprise:
   receiving the resource entity preferences from the resource entity system, via a portal interface;
   storing the resource entity preferences in a data store;
   receiving the third party entity preferences from at least one of a third party system and the resource entity system, via the portal interface; and
   storing the third party entity preferences in the datastore.

11. The computer program product according to claim 7, wherein the computer-executable instructions further comprise:
   generating metrics associated with the one or more recommendations; and
   displaying the metrics via a portal interface to a user.

12. The computer program product according to claim 7, wherein the computer-executable instructions further comprise:
   determining a type of each of the resource transfer request;
   identifying that at least one resource transfer request is associated with a predetermined type;
   flagging the at least one resource transfer request; and
   routing the at least one resource transfer request via a predetermined resource transfer method.

13. A computer implemented method for intelligent routing of resources, comprising:
   monitoring one or more channels, wherein the one or more channels are associated with sources of initiation of resource transfer requests, wherein the one or more channels comprise a resource entity payment management portal, an entity application, an entity payment management portal, an API, a file transfer, an online channel, and a host2host channel;
   receiving a resource transfer request from a resource entity system via at least one channel of the one or more channels;
   in response to receiving the resource transfer request, generating, via an artificial intelligence engine, one or more recommendations associated with routing of the resource transfer request, wherein each of the one or more recommendations comprises a resource transfer method, wherein generating the one or more recommendations is based on resource entity preferences, third party entity preferences, location of a third party associated with the resource transfer request, speed of the resource transfer request, security associated with the resource transfer request, and resources associated with the resource transfer request; and
   routing the resource transfer request via the resource transfer method associated with at least one recommendation of the one or more recommendations.

14. The computer implemented method according to claim 13, wherein routing the resource transfer request via the resource transfer method is based on automatically selecting the at least one recommendation based on one or more factors.

15. The computer implemented method according to claim 13, wherein routing the resource transfer request further comprises:
   displaying the one or more recommendations to a user associated with the resource entity system, via a graphical user interface associated with the at least one channel;
   receiving a selection from the resource entity system, via the graphical user interface, wherein the selection comprises the resource transfer method associated with the at least one recommendation; and
   initiating the resource transfer request via the resource transfer method associated with the at least one recommendation.

16. The computer implemented method according to claim 13, wherein the method further comprises:
   receiving the resource entity preferences from the resource entity system, via a portal interface;
   storing the resource entity preferences in a data store;
   receiving the third party entity preferences from at least one of a third party system and the resource entity system, via the portal interface; and
   storing the third party entity preferences in the datastore.

17. The computer implemented method according to claim 13, wherein the method further comprises:
   generating metrics associated with the one or more recommendations; and
   displaying the metrics via a portal interface to a user.

18. The computer implemented method according to claim 13, wherein the method further comprises:
   determining a type of each of the resource transfer request;
   identifying that at least one resource transfer request is associated with a predetermined type;
   flagging the at least one resource transfer request; and
   routing the at least one resource transfer request via a predetermined resource transfer method.

* * * * *